A. A. KING.
TERMINAL LINK FOR SKID CHAINS.
APPLICATION FILED FEB. 3, 1920.
1,402,868. Patented Jan. 10, 1922.
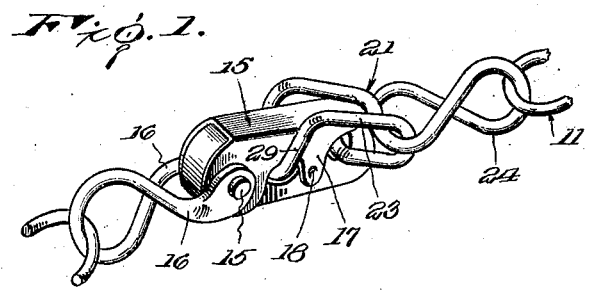
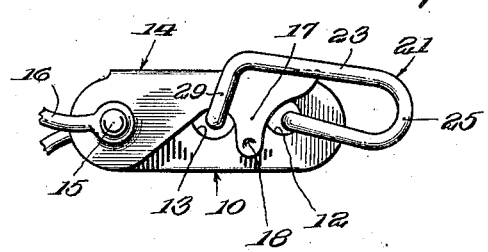
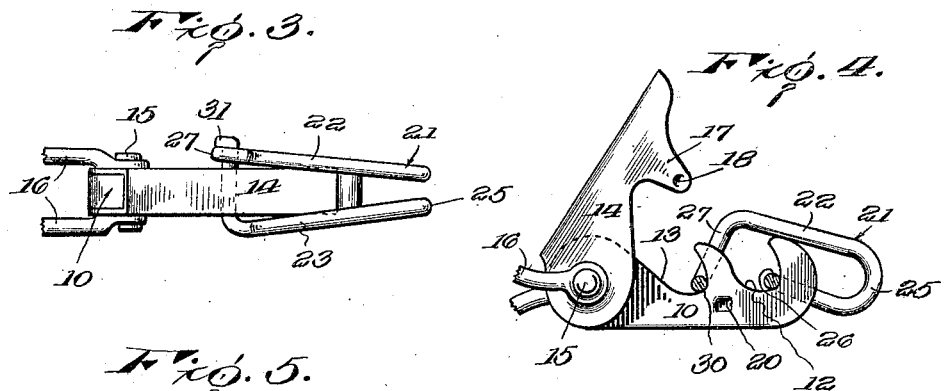
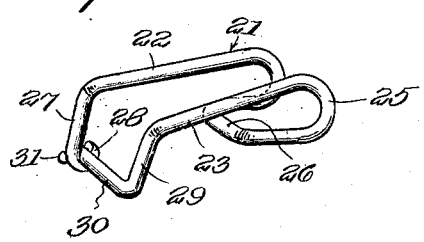
Inventor.
A. A. King.
by Lacey & Lacey, Attys.

UNITED STATES PATENT OFFICE.

ALONZO A. KING, OF PAONIA, COLORADO.

TERMINAL LINK FOR SKID CHAINS.

1,402,868.  Specification of Letters Patent.  Patented Jan. 10, 1922.

Application filed February 3, 1920. Serial No. 355,896.

*To all whom it may concern:*

Be it known that I, ALONZO A. KING, a citizen of the United States, residing at Paonia, in the county of Delta and State of Colorado, have invented certain new and useful Improvements in Terminal Links for Skid Chains, of which the following is a specification.

This invention relates to improvements in anti-skid devices for motor vehicles and more particularly to an improved terminal link for connecting the meeting ends of the anti-skid chain.

An important object of this invention is to provide a terminal link for skid chains provided with novel means for securing the keeper in engagement with the clasp of the skid chain.

A further object of the invention is to provide a terminal link for skid chains having a pair of clasp engaging members adapted to be received and securely locked within a corresponding pair of locking notches or recesses in the clasp of the skid chain.

A further object of the invention is to provide a terminal link for skid chains which is of highly simplified construction, efficient in use and cheap to manufacture.

Other objects and advantages of the invention will be apparent during the course of the following description.

In the accompanying drawing forming a part of this application and in which like numerals are employed to designate like parts throughout the same, Figure 1 is a perspective view of the improved terminal link applied, Figure 2 is a side elevation of the improved terminal link applied, Figure 3 is a plan view of the same applied, Figure 4 is a central vertical longitudinal section through the link engaged with the clasp or fastener of a skid chain, Figure 5 is a perspective of the improved terminal link detached.

In the drawing wherein for the purpose of illustration is shown a preferred embodiment of the invention, the numeral 10 designates a fastener adapted for connecting the meeting ends of an anti-skid chain 11 after the anti-skid chain has been arranged about the tire of a vehicle wheel. In the so-called Weed chain for vehicle wheels, the fastener 10 of the same is provided with locking notches 12 and 13 either of which is adapted for receiving the connecting link of one end of the chain. The clasp is provided with a keeper 14 which, as illustrated in the drawing, is formed from a blank of metal curved transversely and having its longitudinal edge portions provided with apertures for receiving a transversely extending pin 15 which is also extended through the body of the clasp and the arms of a link 16 of the skid chain. The side edges of the keeper 14 are each provided with a depending ear 17 notched, as indicated at 18, to cooperate with a second set of notches or recesses 20 in the sides of the clasp 10 so as to securely lock the keeper to the clasp.

Specifically, this invention includes an improved terminal link generally designated by the numeral 21 and which is adapted to engage the clasp in such a manner that accidental disconnection of the link with the clasp is rendered extremely unlikely. As illustrated in Figure 5, the terminal link 21 is formed from a single length of wire bent intermediate its ends to form side arms 22 and 23 which, as illustrated in Figure 3, converge slightly towards one end. The arms 22 and 23 are extended downwardly and inwardly at a point spaced from one of their ends so as to form a means for engaging the link 24 of the skid chain 11. The downwardly and inwardly inclined portions of the arms 22 and 23 are designated by the numeral 25 and said downwardly and inwardly extending portions of the arms 22 and 23 are joined by a transversely extending connecting portion 26 which, as illustrated particularly in Figure 4, is adapted to be received within the locking notch 12.

The other end portion of the arm 22 is extended downwardly as indicated by the numeral 27 and is looped, as indicated at 28, for receiving the end portion of the arm 23. The arm 23 has one end portion extended downwardly, as indicated at 29, in spaced parallel relation to the downwardly extending portion 27 of the arm 22 and then laterally to form a connecting portion 30 which is extended through the loop 28 and then bent, as indicated at 31, for securely connecting the laterally extending portion 30 of the arm 23 to the downwardly extending portion 27.

By this construction the connecting portions 26 and 30 are arranged in spaced parallel relation so that the same may be simultaneously received within the inclined locking recesses 12 and 13. The keeper 14 is swung downwardly into engagement with the forward portion of the clasp after the connecting portions 26 and 30 of the link have been arranged within the inclined locking notches so that said link is securely held in engagement by the keeper 14. As particularly illustrated in Figure 3, the forward portion of the keeper 14 is of a greater width than the space between the adjacent portions of the arms 22 and 23 so that it is necessary for the keeper to spring the arms outwardly to some extent upon being moved to a closed position. After the keeper has been moved to the position illustrated in Figure 2, the arms 22 and 23 overhang the forward portions of the same for securely retaining the keeper in position. In other words, the arms 22 and 23 have their intermediate portions engaged with the forward portion of the keeper 14 so as to lock the keeper against accidental pivotal movement.

Summarized, it might be stated that this invention embodies an elongated link having one of its end portions extended downwardly and inwardly and arranged in spaced relation to the other end portion of the link which is also extended downwardly so that both of the end portions of the link may be secured within the pair of locking notches in the clasp of an anti-skid chain. By this construction the terminal link is securely connected to the clasp and is prevented from disconnection with the clasp as the result of the keeper accidentally moving outwardly. As set forth above the arms of the link engage the forward or free end portion of the keeper and thereby prevent the keeper from accidentally moving outwardly after being positioned as illustrated in Figure 2 of the drawing. When it is desired to release the terminal link from connection with the fastener, the keeper is sprung outwardly in the usual manner so that the connecting portions 26 and 30 may be moved out of the inclined locking notches 12 and 13.

It will be noted with reference to Figure 1 that the link 24 may be readily connected to the improved terminal link forming the subject matter of this invention and the possibility of dislocation of the link 24 is reduced to a minimum.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

1. The combination with a clasp having transverse notches, of a terminal link having spaced transverse terminals adapted to engage in the transverse notches of the clasp and provided adjacent one terminal with chain-link-engaging members.

2. Connecting means for anti-skid chains including a terminal link consisting of spaced arms doubled on themselves at one end to form chain-link-engaging hooks, the terminals of said hooks being connected by a transverse fastening engaging member, and the opposite ends of the arms being extended laterally and connected by a transverse fastening-engaging member, one end of the chain being engaged by said hooks, and a clasp carried by the opposite end of the chain and engaging the transverse members of the terminal link.

3. A connecting device for skid chains including a pair of converging arms each having one end portion doubled upon itself to form chain link and chain fastener-engaging portions, the fastener-engaging portions connecting the arms, the opposite end portions of the arms being joined and extended angularly and arranged in spaced relation to the first-mentioned end portions of said arms, one end of the chain being engaged with the doubled end portions of the arms, and a clasp carried by the opposite end of the chain and engaging the connections between the arms, the arms having binding engagement with the sides of the clasp to hold the same closed.

4. A connection for anti-skid chains including a terminal link formed from a single length of wire bent intermediate its ends to form a pair of arms, one end portion of each of said arms being extended angularly for forming chain-engaging members and a fastener-engaging member connecting said chain-engaging members, the opposite end portion of one of said arms being extended angularly and connected to the corresponding end portion of the other arm to form a fastener-engaging member, a chain having one end engaged with said chain-engaging members, and a clasp carried by the opposite end of the chain and engaging the fastener-engaging members.

5. The combination of an anti-skid chain fastener having a keeper pivoted thereto, and an elongated link having its end portions extended angularly for forming fastener engaging members, the sides of said link being adapted to engage the forward portion of said keeper for securing the keeper in position.

In testimony whereof I affix my signature.

ALONZO A. KING. [L. S.]

Witnesses:
M. H. Crissnan,
John S. Head.